(12) United States Patent
Morris

(10) Patent No.: US 6,453,361 B1
(45) Date of Patent: Sep. 17, 2002

(54) META-APPLICATION ARCHITECTURE FOR INTEGRATING PHOTO-SERVICE WEBSITES

(75) Inventor: Robert Paul Morris, Raliegh, NC (US)

(73) Assignee: IPAC Acquisition Subsidiary I, LLC, Peterborough, NH (US)

( * ) Notice: Subject to any disclaimer, the term of this patent is extended or adjusted under 35 U.S.C. 154(b) by 103 days.

(21) Appl. No.: 09/698,777

(22) Filed: Oct. 27, 2000

(51) Int. Cl.[7] .............................................. G06F 15/16
(52) U.S. Cl. ...................................... 709/250; 709/203
(58) Field of Search ................................ 709/203, 200, 709/250

(56) References Cited

U.S. PATENT DOCUMENTS

| | | | | |
|---|---|---|---|---|
| 4,513,373 A | * | 4/1985 | Sheets | 709/236 |
| 5,226,120 A | * | 7/1993 | Brown et al. | 709/224 |
| 5,490,252 A | * | 2/1996 | Macera et al. | 709/249 |
| 5,513,373 A | | 4/1996 | Damkier | 709/249 |
| 5,838,926 A | | 11/1998 | Yamagishi | 709/249 |
| 5,991,180 A | | 11/1999 | McHann, Jr. | 709/224 |
| 5,991,806 A | * | 11/1999 | McHann | 709/224 |
| 5,999,968 A | * | 12/1999 | Tsuda | 709/213 |
| 6,085,195 A | * | 7/2000 | Hoyt et al. | 709/250 |

* cited by examiner

Primary Examiner—David Y. Eng
(74) Attorney, Agent, or Firm—Sawyer Law Group LLP

(57) ABSTRACT

A meta-application architecture for integrating photo-service-based websites is disclosed. The online system includes a plurality of client devices capable of storing and displaying digital images, wherein a portion of the client devices communicate data in different formats. The system also includes a plurality of online photo-service sites, wherein each of the photo-service sites utilize different data models. The online system further includes a server for communicating with both the client devices and the photo-service sites over a network. A meta-application is also provided that is accessible by the server for defining a common data model format for the different formats of the photo-service sites. In operation, when a request is received from a client device for photo-services from a particular photo-service site, the request is passed to the photo-service site. When a response from the photo-service site is received, the response is converted from the data model of the photo-service site to the common data model format, and the converted request is then presented to the requesting client device in the data format required by the requesting client device.

25 Claims, 2 Drawing Sheets

META-APPLICATION ARCHITECTURE FOR INTEGRATING PHOTO-SERVICE WEBSITES

FIELD OF INVENTION

The present invention relates to transferring digital images over the Internet, and more particularly to providing an architecture for integrating photo-service-based websites for access by client devices.

BACKGROUND

As the popularity of digital cameras grows, the desire of digital camera users to share their images with others will also continue to grow. The best approaches to photo-sharing take advantage of the Internet. One such approach is for users to store the digital images on a PC and then send the images to others using email. Several Internet companies now offer an even more convenient approach by providing photo-sharing websites that allow users to store their images for free and to arrange the images into web-based photo albums. Once posted on a photo-sharing website, others may view the images over the Internet.

While convenient for storing digital images, getting the images to the photo-sharing websites can be challenging for users. Most commonly, users must upload their images from the digital camera to a PC using a cable or IrDA, or by inserting the camera's flash card into the PC. From the PC, the user logs onto the Internet and uploads the images to a photo-sharing website. After uploading the images, the user works on the website to arrange the images into web albums and to add any textual information.

The assignee of the present application developed an approach to uploading images to the web that does not require the use of a PC. In this approach, an email software application is loaded into a digital camera capable of running software that allows the user to e-mail the images directly from the camera. The user simply connects his or her digital camera to a cellphone or modem, runs the e-mail application, and selects the desired images and the email recipients. The selected images are then sent to the recipients as e-mail attachments.

Although emailing photos directly from the camera allows users who do not own a PC to share images over the Internet, these users must still establish accounts with both an Internet service provider (ISP) and the photo-sharing website before being able to post their images. Cameras are not designed for text entry, and the information required may be somewhat technical in nature. Consequently, establishing the accounts by entering account and configuration data on the digital camera itself may prove to be a difficult task for most users.

The assignee of the present invention has developed another technique for uploading images to the Internet, which does not require the user to enter configuration data, as described in U.S. Pat. Application Ser. No. 09/625,824 entitled "Method And System For Automatically Configuring A Hand-Held Electronic Device For Accessing A Site On A Public Network" filed on Jul. 26, 2000.

In this system, cameras connect to a gateway server on the Internet via a service provider, which may include a wireless carrier and/or an Internet service provider (ISP). In order to create a camera that requires no configuration to connect to the Internet, the camera is provided with a software application that is pre-configured to establish communication with the ISP and the gateway server. The first time the camera establishes communication, the camera sends information uniquely identifying the electronic device to the gateway server. The server then sends user account information to the device, including an account ID and password, created based on the electronic device information. The user account information is then stored on the camera for use the next time the electronic device accesses the website. Thus, the user does not have to enter account information in order to establish the ISP connection or the website account before accessing the Internet.

The gateway performs two basic services for the client. First, it is the camera's home base, which provides authentication services (user and device) and configuration services (it updates the camera's configuration, so the user doesn't have to). Second, it receives and responds to the camera application's requests using a protocol both understand. Services available to a camera may include the ability to send images from the camera to a specific photo-service service and the ability to send emails with links to uploaded images.

The current gateway solution is built on traditional client-server architecture, where a software application on the camera communicates with a software application on the server. Client-server architecture requires custom software on all three tiers of the current architecture; the camera, the gateway, and the photo-service site. In addition, the current gateway solution only enables communication with digital cameras, not other mobile devices.

A newer model for application deployment on the Internet today is server-based (i.e., ASP model), where a client device equipped with a web browser communicates with a web server. Browser-based devices simply download web pages from the server, which provides the application function and data. The deployment of applications using this new server-based architecture is growing much faster than the deployment of client-server based applications because browser-based clients do not require a gateway that "speaks" the client application's protocol. Thus, browser-based clients may connect to the photo-service sites directly, since the devices are browser-based. In addition, browser-based clients also do not require embedded custom software for requesting imaging services from the photo-service sites. Instead, once connected, users of these devices could interact with the photo-services sites directly using the device's browser, if the sites support the specific browsers in these devices, or indirectly via a transcoding gateway.

A transcoding gateway converts the sites' HTML to a format suitable for the various browser types. Transcoding products exist today that can support multiple browser-based clients that are both wireless and wired. Transcoding technology takes a formatted input stream (typically HTML) from a web server and converts it to an output stream in another format (e.g., WML for WAP phones, cHTML for i-mode phones, etc) of a particular type of browser-based device. Digital cameras will soon be equipped with browsers, just as PDA's and cellphones are, and such transcoding products allow, or soon will allow, browser-based devices to access the images and image services of photo-services sites.

The primary impediment to making these services available from the photo-service sites is the effort required to make the presentation of these services palatable to the various types of browser-based devices, given the variety of display characteristics and browser technologies. There are two approaches to addressing this presentation problem.

One approach is for each photo-host site to build custom web pages for each specific device/browser type. That is, the host site would need to provide web pages formatted in HTML, WML, cHTML, and so on, and preprocess images to suit the device display capabilities. This is both labor intensive to initially setup and difficult to maintain as changes are made to the site's data and services.

A second approach, is to use a transcoding product, such as a WAP gateway or Oracle's Portal-to-Go. The problem with the transcoder approach is that it tries to solve a very broad problem, making all HTML encoded information presentable in a number of other different formats. Consequently, transcoders often produce unsatisfactory results. Transcoders thus serve as a temporary solution while photo-service sites build support for each of the various devices directly into their sites.

As digital imaging grows in popularity, there will be a need for disparate photo-service sites to integrate their offerings (e.g., photo-hosting from one, and printing from another). This requires that two photo sites wishing to become partners must each enable their sites to communicate. Neither of the two approaches described above addresses the requirement of integrating the services that span the sites of multiple photo-service providers. Since there is no standard for inter-site communication for photo-service sites, this effort must be undertaken for each new partner a site agrees to work with.

Accordingly, what is needed is an Internet offering that integrates services that span the sites of multiple photo-service providers and that may be used with either browser-based or browser-less client devices. The present invention addresses such a need.

SUMMARY OF THE INVENTION

The present invention provides a meta-application architecture for integrating online photo-service websites. The online system includes a plurality of client devices capable of storing and displaying digital images, wherein a portion of the client devices communicate data in different formats. The system also includes a plurality of online photo-service sites, wherein each of the photo-service sites utilize different data models. The online system further includes a server for communicating with both the client devices and the photo-service sites over a network. A meta-application is also provided that is accessible by the server for defining a common data model format for the different formats of the photo-service sites. In operation, when a request is received from a client device for photo-services from a particular photo-service site, the request is passed to the photo-service site. When a response from the photo-service site is received, the response is converted from the data model of the photo-service site to the common data model format, and the converted request is then presented to the requesting client device in the data format required by the requesting client device.

According to the present invention, the meta-application architecture integrates the services of photo-service sites for access by client devices and frees photo-service sites from some of the complexities of dealing with non-PC devices, such as digital cameras. The meta-application architecture is also capable of integrating the imaging services associated any other type of vertical business segment that uses and shares digital images, and provides a more efficient mechanism for getting needed images into such business workflows.

DETAILED DESCRIPTION OF THE INVENTION

The present invention relates to an online digital imaging architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a meta-application architecture for allowing photo-service websites to receive and send images to and from a wide range of client device types, and for integrating the services of the photo-service sites 14 for access by users of the client devices, without requiring significant upfront or ongoing costs for the photo-service sites.

Figure 1:
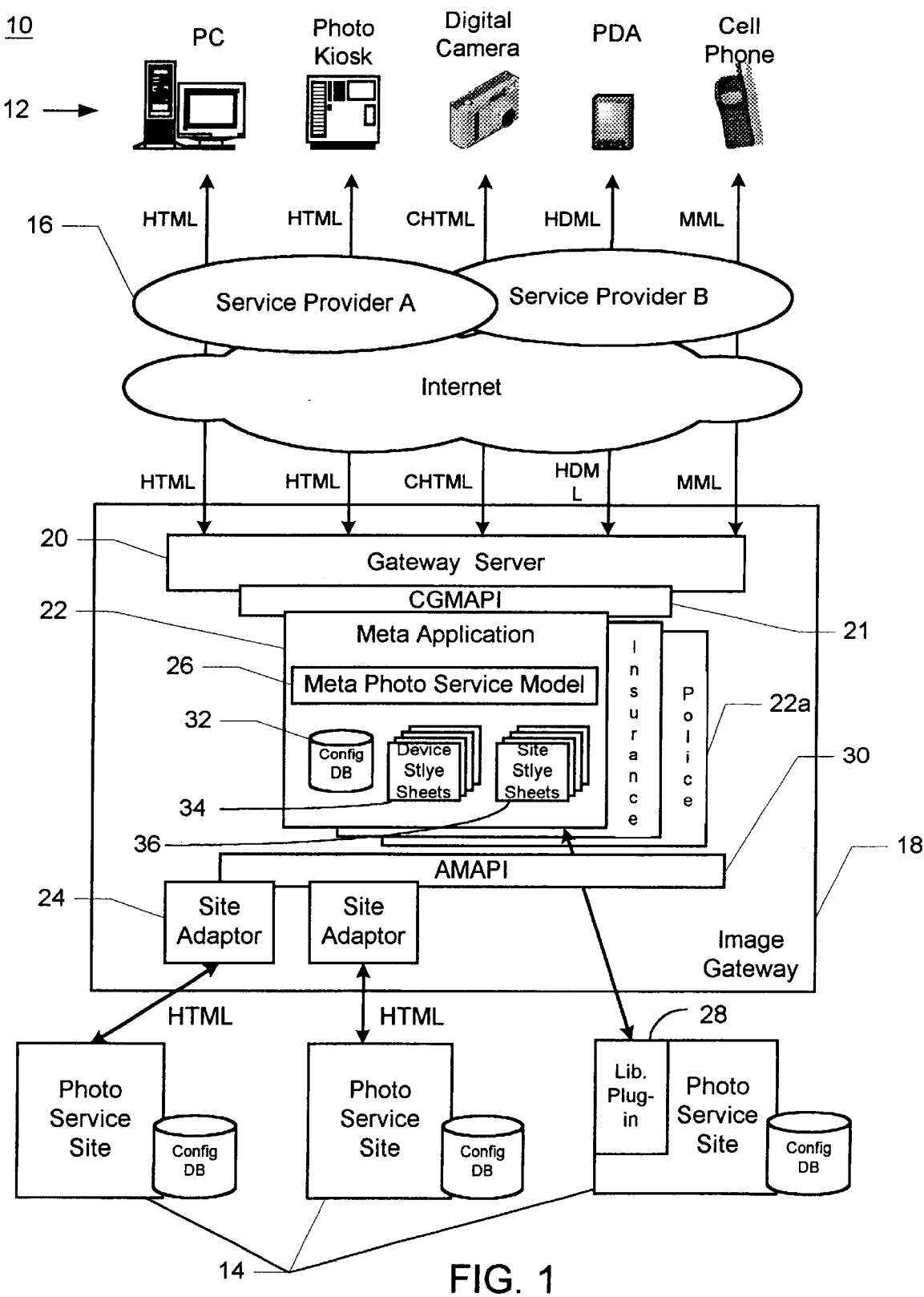
FIG. 1 is a block diagram illustrating a meta-application architecture for an online system in accordance with a preferred embodiment of the present invention.

FIG. 1 is a block diagram illustrating a meta-application architecture for an online system 10 in accordance with a preferred embodiment of the present invention. The system 10 includes multiple client devices 12 that request imaging services from multiple online photo-service sites 14. The photo-service sites 14 are sites on the Internet that provide different types of digital imaging services. For example, one photo-service site 14 may provide an image hosting service, while another photo-service site 14 provides image printing services, for instance.

A client device 12 refers to an electronic device capable of capturing and/or displaying digital images and communicating over a network, such as the Internet. Such electronic devices include PCs, photo kiosks, digital cameras, PDAs, and cellphones, for example. In a preferred embodiment, the client devices 12 are browser-based, although non-browser-based devices may also be supported. The client devices 12 communicate over the Internet via a wireless, or wired connection, but because they incorporate different browser types, the client devices 12 communicate data in different formats. For example, some client devices 12 such as PCs may communicate data in HTML format. Other client devices 12 such as cellphones, may use data formats such as Wireless Markup Language (WML), which is a streamlined version of HTML for small screen displays, cHTML which is a subset of HTML, and Handheld Device Markup Language (HDML), for instance.

In one embodiment, the client devices 12 connect to the Internet via a service provider 16, which may include a wireless carrier and/or an Internet service provider (ISP) that is capable of servicing many devices simultaneously. Once connected to the Internet, the client devices 12 have the capability of uploading the digital images to the online photo-service sites 14 for storage and/or for receiving digital images from the photo-service sites 14 for display.

The photo-service sites 14, however, typically communicate data over the Internet using HTML. In order to support the various types of client devices, each photo-service site 14 would either have to build custom web pages for each specific type of client device 12, or use a transcoding product to convert the photo-service site's HTML web pages into the format of the requesting client device 12. As stated above, both approaches have disadvantages.

More problematic, however, is the fact that currently there are no methods for integrating the services of the various photo-service sites 14. For example, there is currently no easy way for users of the client devices 12 to move their images from one photo-service to another. Allowing users of one photo-service site 14 to share images with people who use different photo-service sites 14 has not been addressed. Currently, any integration between photo-service sites 14 for offering the services of one photo-service site 14 on the other requires a joint effort of both parties. For example, a photo-hosting site may collaborate with a photo-print site to offering printing services from the photo-hosting site. Each attempt to integrate the services of two photo-service sites 14 requires a significant amount of work in implementing the integration because there are no standard protocols for site-to-site communication.

The present invention provides a meta-application 22 architecture that solves the foregoing problems by providing a common communication framework that meets the needs of the client devices 12 and the photo-service sites 14. The online system includes a site on the Internet, referred to as the image gateway 18, that interfaces between the client devices 12 and the photo-service sites 14. In a preferred embodiment, the image gateway 18 includes a gateway server 20, a software meta-application 22, and a set of site adapter software 24 that provide a set of standard APIs and data formats that the photo-service sites 14 use so that the image gateway 18 can present data and services from the sites 14 to the various client devices 12. These same APIs and data formats allow the image gateway 18 to present the services of multiple photo-services 14 in one integrated application, and allow communication among the photo-services sites 14. For example, the image gateway 18 enables a user with images stored on one photo-host site to access to the services of all print service providers who also use the image gateway 18. The photo-hosting site 14 would not need to make any special effort in order to work with the print service providers since they are all bound together by the meta-application.

The gateway server 20 performs the function of a web server, while the meta-application 22 performs the function of an application server. The meta-application 22 may reside on the same or different computer from the gateway server 20. The gateway server 20 provides client device 12 connectivity (HTTP) and is primarily responsible for detecting the client device 12 type and its browser type and display characteristics. The gateway server 20 may also provide security, configuration, and administration services, including the collection of usage statistics.

In a preferred embodiment, the gateway server 20 communicates with the meta-application 22 through a gateway server meta-application programming interface (GCMAPI) 21. This GCAPI 21 between the gateway server 20 and the meta-application 22 enables the gateway server 20 to pass the data and service requests of the client devices 12 to the meta-application 22 in a device independent fashion.

One reason that there is no standard for communication between photo-service sites 14 is because each photo-service site 14 represents its own data and services in different formats. For example, all photo-hosting web sites 14 organize a user's images in a nested tree-like structure similar to a file directory, but the names of the nodes in these trees vary across sites. For instance, some of the terms used include "album," "pholio," "page," "shelves," and sewer.

According to the present invention, the meta-application 22 abstracts the underlying data model and the function provided by the photo-service sites 14, which is common across the photo-service sites 14, to define a common data model format for the data, referred to here as a meta photo-service model. In a preferred embodiment, the meta photo-service model is implemented using XML.

Since each photo-service site 14 may use its own data model and define its own API or protocol for accessing the site's functionality, respective site adapters 24 are used to convert between the data and service formats of each photo-service site 14 and the meta photo-service model 26.

In a preferred embodiment, the site adapters 24 resides on the same server site as the meta-application 22. This allows the photo-service site 14 to use its existing access protocols and may allow the photo-service site 14 itself to remain unchanged. Alternatively, and photo-service site 14 may choose to install a meta-application library plug-in 28 on its own site. The library plug-ins 28 use a standard protocol to communicate with the meta-application. The use of library plug-ins 28 should result in less data being sent between the photo-service site 14 and the image gateway, since the data is reduced to only that data the meta-application 22 requires. Whether local or remote, the site adaptors 24 communicate with the meta-application 22 through an adapter meta-application programming interface (AMAPI) 30. Through the use of the AMAPI 30, additional site adapters 24 may be added to the image gateway 18 as new sites are supported. This allows the image gateway 18 to redirect uploaded images to any number of different photo-service sites 14 or business specific servers, as requested by the client device 12.

In a preferred embodiment, the image gateway 18 is provided with a database 32 for supporting the aggregation of data and services across the various photo-service sites 14. This enables the image gateway 18 to support single login for a particular client device 12 and enables data sharing, such as billing information, across photo-service sites 14. This data sharing eliminates the need for users to reenter this information for each site, but requires that the database 32 to be synchronized with the data stored on the photo serving sites.

In a preferred embodiment, the meta-application 22 is provided with the device-specific XSLT style sheets 34 that specify the required presentation of the data and functions to be displayed on each of the supported device types. Used alone the device-specific style sheets would produce displays that do not reflect which photo-service site 14 is providing the services. Therefore, site-specific style sheets 36 are also provided that further modify the meta-application's response to identify the photo-service site 14 providing the services.

Figure 2:
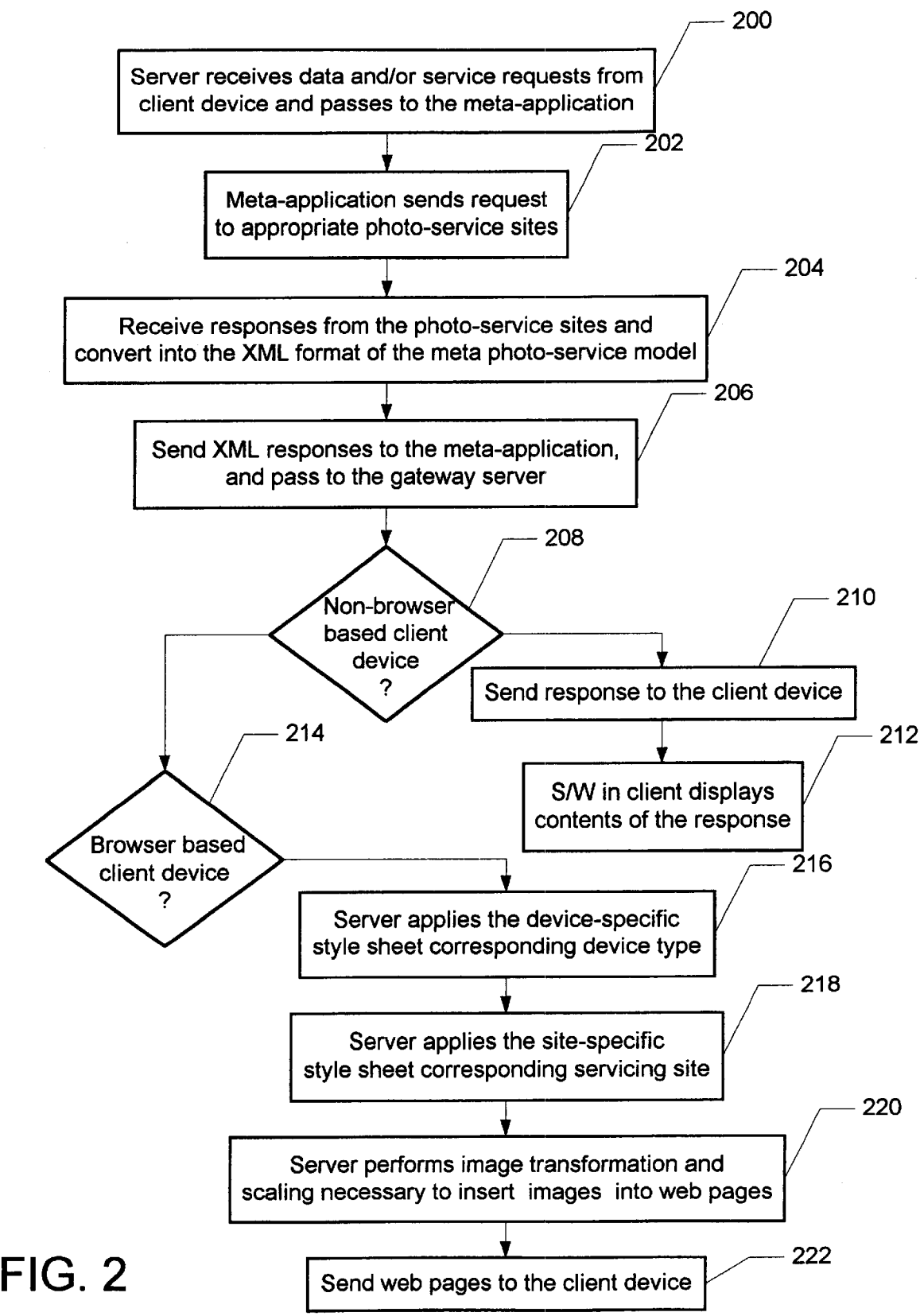
FIG. 2 is a flow chart illustrating the process of integrating services of photo-service sites for access by client devices in accordance with a preferred embodiment of the present invention.

FIG. 2 is a flow chart illustrating the process of integrating services of photo-service sites 14 for access by client devices 12 in accordance with a preferred embodiment of the present invention. Once communication between the client device 12 and the image gateway 18 has been established, the gateway server 20 receives data and/or service requests from the client device 12 and passes them to the meta-application 22 in a device independent fashion in step 200. The request, for example, may specify that images are to be uploaded and the stored at one photo-hosting site, and that other images are to be downloaded from another photo-hosting site for display.

The meta-application 22, in turn, sends the request to the appropriate photo-service sites 14 in step 202. The site adapter 24 receives the responses from the photo-service sites 14 and converts the responses into the XML format of the meta photo-service model 22 in step 204. The XML responses are then sent to the meta-application 22 through the AMAPI 30, and the meta-application 22 passes the response to the gateway server 20 through the GCMAPI 21 in step 206.

The gateway server 20 then converts the XML response into a format appropriate for the requesting client device 12. If the requesting client device 12 is non-browser based in step 208, then the gateway server 20 sends the response to the client device 12 in step 210, and specialized software in the device is responsible for displaying the contents of the response in step 212.

If the requesting client device 12 is browser-based and expects web pages in step 214, then gateway server 20 first applies the device-specific style sheet 34 corresponding to the type of requesting client device 12 to the response in step 216. The gateway server 20 also applies the site-specific style sheet 36 corresponding to the site supplying the service in step 218. Thereafter, the gateway server 20 performs any image transformation and scaling necessary to provide images in the web pages suitable for display on the requesting client device 12 in step 220, and send the web pages to the client device 12 in step 222.

According to present invention, the meta-application 22 architecture not only may be used to address the integration problem in the photo-services business segment, but the architecture may be extended to integrate the services across sites in other business segments as well (e.g., insurance, law enforcement, etc) that have a common underlying service model. This may be accomplished by providing a respective meta-application 22 for each desired industry segment to provide the underlying meta service model.

As an example, consider a meta-application 22a designed for the police industry where police departments store and process digital images of criminals and suspects. The police meta-application 22a would abstract the police data model and business rules that are common to most police departments. The presentation of the images may be different than in the photo industry because the police may need to have the images integrated into all-points-bulletins (APBs), rather than displayed in web albums, In addition, the police meta-application 22 may be designed such that one police department can query the image server of the other police departments. It should be noted that the police industry example represents a business-to-business model, rather a consumer-to-business model, as described in the preferred embodiment.

A meta-application architecture has been disclosed that integrates the services of photo-service sites 14 for access by client devices. The meta-application architecture of the present invention frees photo-service sites 14 from some of the complexities of dealing with non-PC devices, such as capture devices and other portable devices. The meta-application architecture provides an end-to-end solution that integrates client devices, the image gateway, and the photo-service server. The types of users who benefit from this type of solution extend beyond camera users. For photo-service web sites, the gateway solution offers an additional avenue for obtaining its customers images (a valuable asset), which is simpler to use than the current upload to the PC methods in use today. The meta-application architecture is also capable of integrating the imaging services associated with vertical business segments that use and share digital images, and provides a more efficient mechanism for getting needed images into such business workflows.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An online system, the online system including a plurality of client devices capable of storing and displaying digital images, wherein a portion of the client devices communicate data in different formats, the system further including a plurality of online photo service sites, wherein each of the photo service sites utilize different data models, the online system comprising:

a server for communicating with client devices and the photo service sites over a network; and a meta-application accessible by the server for defining a common data model format for the different formats of the photo service sites, such that when a request is received from a client device for photo services from a particular photo service site, the request is passed to the photo service site, and wherein when a response from the photo service site is received, the response is converted from the data model of the photo service site to the common data model format, the converted request is then presented to the requesting client device in the data format required by the requesting client device.

2. The system of claim 1 wherein the server communicates with the meta-application through a server meta-application programming interface that enables the server to pass the requests of the client devices to the meta-application in a device independent fashion.

3. The system of claim 2 further including at least one site adapter in communication with the meta-application for converting between the data models of each photo-service site and the common data model format.

4. The system of claim 3 wherein the converted request is further modified using device-specific style sheets that specify required presentation of the data and functions to be displayed on each of the client device types.

5. The system of claim 4 wherein the converted request is further modified using site-specific style sheets that identify the photo-service site providing the services.

6. The system of claim 5 wherein images in the response are transformed and scaled to provide images in web pages suitable for display on the requesting client device.

7. The system of claim 3 wherein the site adapter communicates with the meta-application through an adapter meta-application programming interface (AMAPI).

8. The system of claim 7 wherein additional site adapters may be added to the image gateway 18 as new photo-service sites are supported.

9. The system of claim 8 wherein a meta-application library plug-in is installed at one of the photo-service site for converting between the data models of each photo-service site and the common data model format.

10. The system of claim 1 further including database a for supporting the aggregation of data and services across the photo-service sites.

11. The system of claim 1 wherein the database is used to support single login for each client device.

12. The system of claim 1 wherein the database is synchronized with data stored on the photo serving sites.

13. A method for integrating services of online photo-service sites for access by client devices, the method comprising the steps of:

(a) receiving requests from multiple client devices for photo services from multiple photo-service sites, wherein the client devices communicate data in different formats, and wherein each of the photo services utilize different data models;

(b) defining a common data model format for the different data models of the photo service sites;

(c) passing the requests to the photo-service sites;

(d) receiving responses from the photo-service sites;

(e) converting the request from the data models of the photo-service sites to the common data model format; and (f) presenting the converted request to the client devices in the data format required by the requesting devices.

14. The method of claim 13 further including the step of defining the common data model format using a meta-application.

15. The method of claim 14 further including the step of passing the request from the client devices to the photo-service sites in a device independent fashion.

16. The method of claim 15 further including the step of providing a site adapter in communication with the meta-application for converting between the data models of each photo-service site and the common data model format.

17. The method of claim 16 further including the step of using device-specific style sheets to modify the converted request, wherein the device-specific style sheets specify required presentation of the data and functions to be displayed on each of the client device types.

18. The method of claim 17 further including the step of using site-specific style sheets to modify the converted request, wherein the site-specific style sheets identify the photo-service site providing the services.

19. The method of claim 18 further including the step of performing image transformation and scaling on images in the response to provide images in web pages suitable for display on the requesting client device.

20. The method of claim 16 further including the step of providing an adapter meta-application programming interface (AMAPI) for allowing communication between the site adapter and the meta-application.

21. The method of claim 20 further including the step of adding additional site adapters as new photo-service sites are supported.

22. The method of claim 20 wherein a meta-application library plug-in is installed at one of the photo-service site for converting between the data models of each photo-service site and the common data model format.

23. The method of claim 13 further including the step of providing a database for supporting the aggregation of data and services across the photo-service sites.

24. The method of claim 23 further including the step of using the database to support single login for each client device.

25. The method of claim 24 further including the step of synchronizing the database with data stored on the photo serving sites.

* * * * *

UNITED STATES PATENT AND TRADEMARK OFFICE
CERTIFICATE OF CORRECTION

PATENT NO.       : 6,453,361 B1
APPLICATION NO.  : 09/698777
DATED            : September 17, 2002
INVENTOR(S)      : Morris It is certified that error appears in the above-identified patent and that said Letters Patent is hereby corrected as shown below:

In the ABSTRACT, the phrase "converted request" should read --converted response--.
In Col. 3, line 50, the phrase "converted request" should read --converted response--.
In Col. 8, lines 27-28, the phrase "converted request" should read --converted response--; in line 40, the phrase "converted request" should read --converted response--; in line 44, the phrase "converted request" should read --converted response--.
In Col. 9, line 10, the phrase "converting the request" should read --converting the response--; in line13, the phrase "converted request" should read --converted response--; and in lines 26-27, the phrase "converted request" should read --converted response--.
In Col. 10, lines 2-3, the phrase "converted request" should read --converted response--.

Signed and Sealed this

Twentieth Day of March, 2007

JON W. DUDAS
*Director of the United States Patent and Trademark Office*